US006246797B1

United States Patent
Castor et al.

(10) Patent No.: US 6,246,797 B1
(45) Date of Patent: Jun. 12, 2001

(54) PICTURE AND VIDEO STORAGE MANAGEMENT SYSTEM AND METHOD

(75) Inventors: Jon S. Castor, Woodside; Charles K. Chui, Menlo Park, both of CA (US)

(73) Assignee: PicSurf, Inc., Mountain View, CA (US)

( * ) Notice: Subject to any disclaimer, the term of this patent is extended or adjusted under 35 U.S.C. 154(b) by 0 days.

(21) Appl. No.: 09/438,666

(22) Filed: Nov. 12, 1999

(51) Int. Cl.$^7$ ................................................. G06K 9/36
(52) U.S. Cl. ............................................................. 382/232
(58) Field of Search .................................. 382/232, 233, 382/234, 240, 244, 246, 247, 248, 260, 263, 264, 276; 341/51, 63, 65, 67, 107; 364/724.011, 724.04, 724.05, 724.13, 724.14, 725.01, 725.02

(56) References Cited

U.S. PATENT DOCUMENTS

| | | | | |
|---|---|---|---|---|
| 5,867,602 | * | 2/1999 | Zandi et al. | 382/248 |
| 5,881,176 | * | 3/1999 | Keith et al. | 382/248 |
| 5,966,465 | * | 10/1999 | Keith et al. | 382/232 |

* cited by examiner

*Primary Examiner*—Jose L. Couso
(74) *Attorney, Agent, or Firm*—Pennie & Edmonds LLP

(57) ABSTRACT

An image processing system stores image files in a memory device at a number of incremental quality levels. Each image file has an associated image quality (that is fidelity or resolution) level corresponding to a quality level at which the corresponding image has been encoded. The images are initially encoded by applying a predefined transform, such as a DCT transform or wavelet-like transform, to image data received from an image capture mechanism and then applying a data compression method to the transform data. The image is regenerated by successively applying a data decompression method and an inverse transform to an image file. Image file size reduction circuitry and one or more state machines are used to lower the quality level of a specified one of the image files, including circuitry for extracting a subset of the data in the specified image file and forming a lower quality version of the specified image file that occupies less space in the memory device than was previously occupied by the specified image data structure. As a result, the amount of space occupied by image files in the memory device can be reduced so as to make room for the storage of additional image files or to allow more rapid transmission in a restricted bandwidth environment.

75 Claims, 7 Drawing Sheets

Image File (Compressed Encoded Image Data Structure)
132

| | |
|---|---|
| Header Data Indicating Size of Image File, image quality level, sizes of analysis arrays, etc. | ~160 |
| Data Representing Analysis Array at position (0,0) | ~162-1 |
| Data Representing Analysis Array at position (0,64) | ~162-2 |
| Data Representing Analysis Array at position (0,128) | ~162-3 |
| . . . | |
| Data Representing Analysis Array at position (64,0) | |
| Data Representing Analysis Array at position (64,64) | |
| Data Representing Analysis Array at position (64,128) | |
| . . . | |

FIG. 4A

Data Representing One Analysis Array
162

| | |
|---|---|
| Header Data Indicating MSB (y) of encoded data | ~170 |
| Data representing y bit plane of encoded data | ~172-1 |
| Data representing y-1 bit plane of encoded data | ~172-2 |
| Data representing y-2 bit plane of encoded data | |
| . . . | |

FIG. 4B

PICTURE AND VIDEO STORAGE MANAGEMENT SYSTEM AND METHOD

The present invention relates generally to the storage of still and video images in an image processing device or system, such as a digital camera or digital video camera or a computer based image storage system, and particularly to a system and method for storing images at different image quality levels and for enabling users to dynamically compress high quality images into lower quality images in order to free up storage for the storage of additional images.

BACKGROUND OF THE INVENTION

Digital cameras typically include either permanent internal storage, and/or removable storage, for storing images. For instance, many digital cameras use removable flash memory cards for storing images. Each flash memory card has a fixed amount of memory, and when the memory card is full it can be removed from the camera and replaced by another flash memory card. In addition, digital cameras typically have a built-in viewer that enables the user to review the images stored on the flash memory card (and/or in the internal memory) and to delete user specified ones of the stored images. Deleting stored images obviously creates room for storing additional images.

When a digital camera user is "in the field" he/she generally has a limited amount of image storage on hand. If all the available image storage is full, the user has the choice of either not taking any additional pictures, or of deleting pictures from the image storage devices on hand to make room for new images. While this is actually one level better than the situation with film cameras, in which the user is simply out of luck when all the available film has been used, it is the premise of the present invention that the current image storage limitations of digital cameras are caused, in part, by failure to fully exploit the advantages of having images stored in digital format.

Similar storage vs. image quality considerations also apply to digitally encoded video frames. In particular, for any given amount of storage space, such as in a digital video camera, the goal is to retain the best image quality for the amount of storage required for a given number of video frames. Current devices allow the user to select image quality prior to capturing a digital video image, but do not enable the user to effectively manage the storage space in the video camera with respect to video sequences already taken, other than by deletion.

It is an object of the present invention to provide a digital camera or digital video camera, or other constrained storage device, that can store images at a plurality of image quality (i.e., fidelity or resolution) levels and furthermore can reduce images initially stored at a first image quality level to a lower image quality level so as to reduce the amount of storage occupied by those images.

It is also an object of the present invention to provide space efficient and computationally efficient image and video handling mechanisms for other applications, including network connected image and video libraries, Internet web browsers executed by client computers coupled to server computers, cable television set top boxes having video storage capabilities, and so on.

SUMMARY OF THE INVENTION

In summary, the present invention is an image processing device or system, such as a digital camera or digital video camera or a computer based image storage system, that can store images at a number of different image quality levels. The image processing device includes a memory device and image management logic. The memory device stores image files that each represent a respective image, each image file having an associated image quality level corresponding to a quality level at which the corresponding image has been encoded. The image management logic includes data processing circuitry and state machines for storing and processing image data received from an image capture mechanism. More specifically, the image management logic includes image processing circuitry and one or more state machines for applying a predefined transform, such as a wavelet-like transform, to image data received from the image capture mechanism to generate transform image data and for applying a data compression method to the transform image data so as to generate an image file having an associated image quality level.

The image management logic also includes image reconstruction circuitry and one or more state machines for successively applying a data decompression method and an inverse transform to a specified one of the image files so as to generate a reconstructed image suitable for display on an image viewer.

Further, the image management logic includes image file size reduction circuitry and one or more state machines for reducing the size of an image file while minimizing the reduction in image quality level. This circuitry extracts a subset of the data in the specified image file and forms a lower quality version of the specified image file that occupies less space in the memory device than was previously occupied by the specified image data structure. As a result, the amount of space occupied by image files in the memory device can be reduced so as to make room for the storage of additional image files or to allow more rapid transmission in a restricted bandwidth environment.

In a preferred embodiment, the image transform data in an image file is organized on a bit plane basis such that image transform data for at least one bit plane is stored in distinct portions of the image data structure from image transform data for other bit planes. To generate a lower quality image file, the image size reduction circuitry extracts a portion of the image file that excludes the image transform data for at least one bit plane and replaces the image file with an image file containing the extracted portion. Further, the image data is also organized on a transform layer basis such that image transform data for at least one transform layer is stored in distinct portions of the image data structure from image transform data for other transform layers. The image size reduction circuitry can also generate a lower quality image file by extracting a portion of the image file that excludes the image transform data for at least one transform layer and replaces the image file with an image file containing the extracted portion.

BRIEF DESCRIPTION OF THE DRAWINGS

Additional objects and features of the invention will be more readily apparent from the following detailed description and appended claims when taken in conjunction with the drawings, in which:

FIGS. 4A and 4B depict image storage data structures.

DESCRIPTION OF THE PREFERRED EMBODIMENTS

In some image processing systems, an image can be stored at a number of discrete resolution levels, typically with each resolution level differing from its "neighbors" by a resolution factor of four. In other words, if the highest resolution representation (at resolution level 1) of the image contains X amount of information, the second resolution level representation contains (for example) X/4 amount of information, the third resolution level representation contains X/16 amount of information, and so on. Thus, an image's "resolution" typically means the amount of image information, and in the context of digital image processing systems is often expressed in terms of the number of distinct pixel elements. The number of resolution levels and the particular amount of information reduction from one level to the next may vary considerably from one system to another. Further, the present invention would be equally applicable to systems having a continuous range of resolution levels.

Another concept concerning image quality is "fidelity." The fidelity of an image can be compromised even if its resolution, in terms of the number of pixels in the image, is unchanged. An image's fidelity can be reduced by reducing the number of bits used to represent the image data. For instance, if the transform coefficients used to represent an image are represented at full fidelity using 12 bits, and then the number of bits used to represent transform coefficients is reduced to 11, the fidelity of the resulting image will be reduced. In other words, the quality of the image reconstructed from the lower fidelity data will be a little less sharp than an image reconstructed from higher fidelity data.

In this document, the terms "image quality" and "quality level" will be used in the general sense of image quality, encompassing both image "resolution" and image "fidelity." Thus, a reduction in an image's "image quality" from a top image quality level to a next highest image quality level might be accomplished either by reducing the image's resolution or by reducing its fidelity, or both. In other embodiments the terms "image quality" and "quality level" may be used to refer to other aspects of image quality as well.

Digital Camera Architecture

Figure 1:
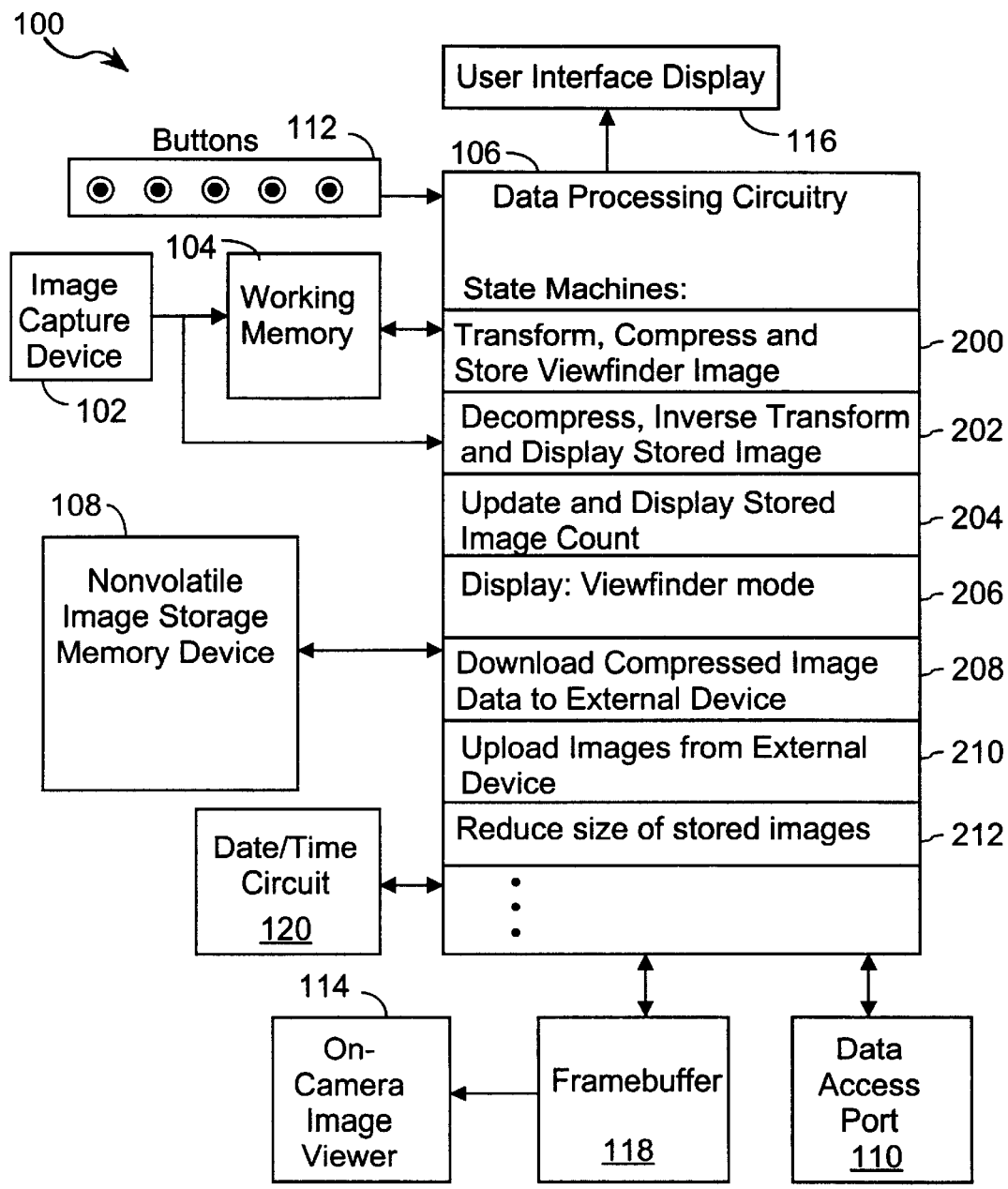
FIG. 1 is a block diagram of a digital camera in accordance with an embodiment of the present invention.

Referring to FIG. 1, there is shown an embodiment of a digital camera system 100 in accordance with the present invention. The digital camera system 100 includes an image capture device 102, such as a CCD or CMOS sensor array or any other mechanism suitable for capturing an image as an array of digitally encoded information. Thus the image capture device is assumed to include analog to digital conversion (ADC) circuitry for converting analog image information into digital values.

A working memory 104, typically random access memory, receives digitally encoded image information from the image capture device 102. More generally, it is used to store a digitally encoded image while the image is being transformed and compressed and otherwise processed by the camera's data processing circuitry 106. Memory 104 may be integrated on the same integrated circuit as other devices, or may be implemented using separate circuit(s).

The data processing circuitry 106 in one embodiment consists of hardwired logic and a set of state machines for performing a set of predefined image processing operations. In alternate embodiments the data processing circuitry 106 could be implemented in part or entirely using a fast general purpose microprocessor and a set of software procedures. However, at least using the technology available in 1999, it would be difficult to process and store full resolution images (e.g., full color images having 1280×840 pixels) fast enough to enable the camera to be able to take, say, twenty pictures per second, which is a requirement for some commercial cameras, as well as digital video cameras. In the future, general purpose microprocessors or general purpose image data microprocessors (e.g., single instruction multiple data (SIMD) processors) may be able to provide the fast image processing needed by digital cameras, in which case the data processing circuit 106 could be implemented using such a general purpose microprocessor or perhaps a hybrid processor system.

Each image, after it has been processed by the data processing circuitry 106, is typically stored as an "image file" in a nonvolatile memory storage device 108, typically implemented using "flash" (i.e., EEPROM) memory technology. The nonvolatile memory storage device 108 is preferably implemented as a removable memory card. This allows the camera's user to remove one memory card, plug in another, and then take additional pictures. However, in some implementations, the nonvolatile memory storage device 108 may not be removable, in which case the camera will typically have a data access port 110 to enable the camera to transfer image files to and from other devices, such as general purpose, desktop computers, computer systems and devices used to warehouse libraries of images, computer systems and devices used to store and distribute image files, and so on. Digital cameras with removable nonvolatile memory 108 may also include a data access port 110.

While the amount of storage in the nonvolatile image memory 108 will vary from one implementation to the next, such devices will typically have sufficient capacity to store 10 to 50 high quality images. Once the nonvolatile image memory 108 is full, if the file size reduction methodology of the present invention is not used, the only way the camera can be used to take additional pictures is either by deleting images from the nonvolatile image memory 108 or by replacing the nonvolatile image memory 108 with another one. If neither of these options are feasible (e.g., because the user has filled all the memory cards he/she has on hand with images that he/she does not wish to delete), then no further pictures can be taken until a new memory device 108 is inserted or the stored images are transferred to an external device (if available).

The digital camera 100 includes a set of buttons 112 for giving commands to the camera. In addition to the image capture button,. there will typically be several other buttons to enable the use to select the quality level of the next picture to be taken, to scroll through the images in memory for viewing on the camera's image viewer 114, to delete images from the nonvolatile image memory 108, and to invoke all the camera's other functions. Such other functions might include enabling the use of a flash light source, and transferring image files to and from a computer. In accordance with the present invention, the user selectable functions, selected by using the buttons 112, further include reducing the size of one or more of the image files stored in the nonvolatile image memory 108 so as to make room for the storage of additional images. The buttons in one embodiment are electromechanical contact switches, but in other embodiments at least some of the buttons may be implemented as touch screen buttons on a user interface display 116, or on the image viewer 114.

The user interface display 116 is typically implemented either (A) as an LCD display device separate from the image viewer 114, or (B) as images displayed on the image viewer 114. Menus, user prompts, and information about the images stored in the nonvolatile image memory 108 may be displayed on the user interface display 116, regardless of how that display is implemented.

After an image has been captured, processed and stored in nonvolatile image memory 108, the associated image file may be retrieved from the memory 108 for viewing on the image viewer. More specifically, the image file is converted from its transformed, compressed form back into a data array suitable for storage in a framebuffer 118. The image data in the framebuffer is displayed on the image viewer 114. A date/time circuit 120 is used to keep track of the current date and time, and each stored image is typically date stamped with the date and time that the image was taken.

Image Data Structures

Figure 2:
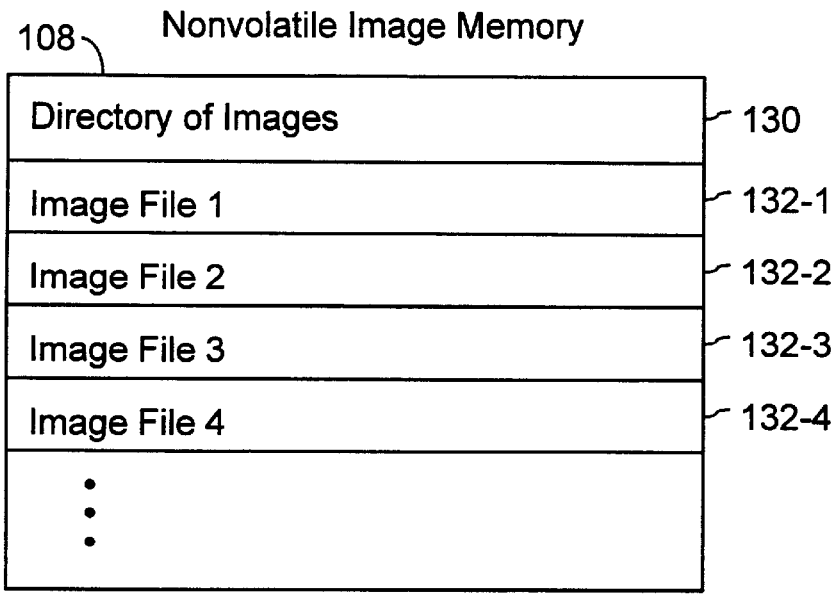
FIG. 2 depicts an image data array divided into a set of smaller analysis arrays for purposes of encoding and data compression.

Referring to FIG. 2, in one embodiment the nonvolatile image memory 108 stores a directory 130 that lists all the image files 132 stored in the memory 108. Preferably, the directory 130 contains information for each stored image file 132, such as the date and time the image was taken, the quality level of the image and the file's location in the memory 108.

Figure 3:
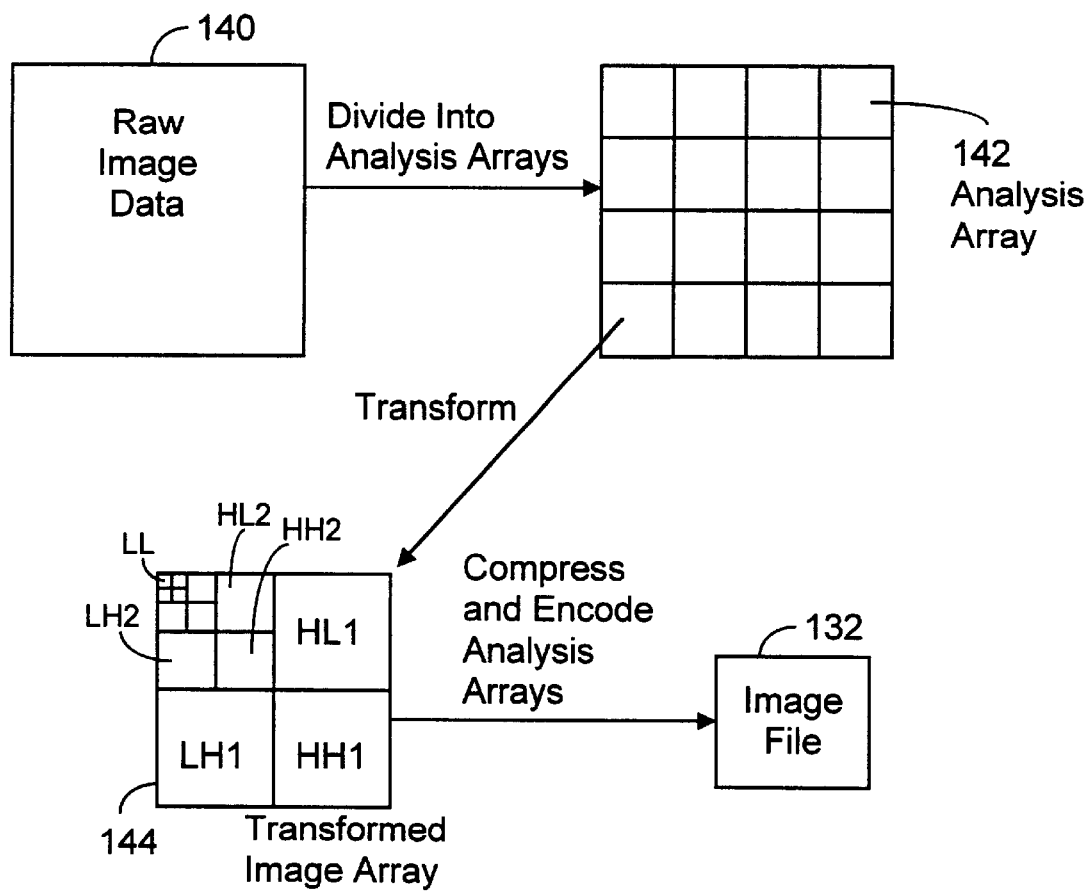
FIG. 3 schematically depicts the process of transforming a raw image data array into a transform image array and compressing the transform image array into a compressed image file.

To understand the image data structure stored in each image file, it is helpful to first understand how an image file is encoded. Referring to FIG. 3, a raw image data array 140, obtained from the digital camera's image capture mechanism 102 (FIG. 1), is treated as a set of non-overlapping "analysis arrays" 142 of a fixed size, such as 32×32, or 64×64 (or more generally $2^n \times 2^n$, for some integer value of n). A sufficient number of subarrays are used to cover the entire data array that is to be encoded, even if some of the subarrays overhang the edges of the data array. The overhanging portions of the subarrays are filled with zero data values during the data encoding process. In a preferred embodiment, the origin of the data array is the top left corner, the first coordinate used to identify data array positions is the "Y" axis or vertical coordinate, and the second coordinate used is the "X" axis or horizontal coordinate. Thus, a position of 0,64 indicates a pixel at the top vertical position of the array, 64 pixel positions over to the right from the array origin, while a position of 32,0 indicates a pixel on the left edge of the array, 32 pixel positions vertically down from the array origin.

An appropriate transform is applied to each of the analysis arrays 142, and then the resulting transform coefficients for each analysis array are quantized (e.g., divided by an appropriate value to generate integer valued, quantized transform coefficients) so as to generate a transformed image array 144. In one embodiment the transform applied to the raw image data is a wavelet-like transform. In other embodiments a DCT transform could be used (which is the type of transform used in current JPEG image encoding systems), or other types of wavelet or wavelet-like transforms could be used.

In this document, the terms "wavelet" and "wavelet-like" are used interchangeably. Wavelet-like transforms generally have spatial frequence characteristics similar to those of conventional wavelet transforms, and are losslessly reversible, but have shorter filters that are more computationally efficient.

In one embodiment the transformed image array 144 is generated by successive applications of a wavelet-like decomposition transform. A first application of the wavelet-like decomposition transform to an initial two dimensional array of "raw" image data generates four sets of coefficients, labeled LL, HL1, LH1 and HH1. Each succeeding application of the wavelet-like decomposition transform is applied only to the LL set of coefficients generated by the previous wavelet transformation step and generates four new sets of coefficients, labeled LL, HLx, LHx and HHx, where x represents the wavelet transform "layer" or iteration. After the last wavelet-like decomposition transform iteration only one LL set remains. The total number of coefficients generated is equal to the number of data samples in the original data array. The different sets of coefficients generated by each transform iteration are sometimes called layers. The number of wavelet transform layers generated for an image is typically a function of the resolution of the initial image. Performing five to seven wavelet transformation layers is fairly typical, but more or less may be used depending on such considerations as the size of the analysis arrays, the subject matter of the image, the data processing resources available for image compression, and the like.

For the purposes of explaining the operation of the image encoding and decoding operations of the present invention, the specific type of image transform used and the specific type of data quantization used to transform a raw image file 140 into a transformed image array 142 are not relevant and therefore are not further described herein. However, a preferred embodiment of the wavelet transform and data quantization methods are described in U.S Pat. No. 5,909518, "System and Method for Performing Wavelet and Inverse Wavelet Like Transformations of Digital Data," which is hereby incorporated by reference as background information.

Each transformed image array 144 is compressed and encoded using a sparse data encoding technique. In one embodiment, the method of compressing and encoding the analysis arrays is the method described in detail in U.S. patent application Ser. No. 08/858,035, filed May 16, 1997, entitled "System and Method for Scalable Coding of Sparse Data Sets," now U.S. Pat. No. 5,949,911, which is hereby incorporated by reference as background information. The encoded image data for all the analysis arrays of the image are combined and stored as an image file 132.

Referring to FIG. 4A, the image file 132 includes header data 160 and a sequence of data structures 162, each representing one analysis array. The header data 160 indicates the size of the image file and the image file's quality level. The header data also includes a list of analysis array size values indicating the length of each of the analysis array data structures 162, thereby enabling fast indexing into the image data Storing size values for the analysis arrays enables the camera's data processing circuitry 106 (FIG. 1) to locate the beginning of any analysis array data structure 162 without having to decode the contents of the earlier analysis arrays in the image file 132.

As shown in FIG. 4B, the encoded data 162 representing any one analysis array is stored in "bit layer order". For each analysis array, the encoding procedure determines the most significant non-zero bit in the data to be encoded, which is herein called the $y^{th}$ bit. The value of y is determined by computing the maximum number of bits required to encode the absolute value of any data value in the analysis array. In particular, y is equal to int($\log_2 V$)+1, where V is the largest absolute value of any element in the analysis array, and "int( )" represents the integer portion of a specified value.

The encoded data 162 representing one analysis array includes (A) header data 170 indicating the maximum number of bits required to encode the absolute value of any data value in the analysis array, and (B) a sequence of data structures 172, each representing one bit plane of the elements in the analysis array. The $x^{th}$ bit plane of the analysis array is the $x^{th}$ bit of the absolute value of each of the elements in the analysis array. A sparse data encoding technique is used so that it takes very little data to represent a bit plane that contains mostly zero values. Typically, higher frequency portions of the transformed, quantized image data will contain more zero values than non-zero values, and further most of the non-zero values will have relatively small absolute value. Therefore, the higher level bit planes of many analysis arrays will be populated with very few non-zero bit values.

In an alternate embodiment, the data structure shown in FIG. 4A is modified slightly. In particular, to facilitate fast extraction of lower-resolution image data from an image file, the boundaries of the analysis arrays are adjusted, if necessary, so as to coincide precisely with the boundaries between the wavelet transform regions shown in FIG. 3 (e.g., the boundary between HL2 and HL1). If the size of the initial image array is not equal to an integer number of analysis arrays (i.e., if either the height or width of the image array is not an integer multiple of $2^n$, where the size of each analysis array is $2^n \times 2^n$ for an integer value of n), at least some of the boundaries between wavelet transform regions will fall in the middle of the analysis regions. For example, for a 800×600 pixel image, the LL region might have a size of 50×38. If the wavelet transform coefficients are encoded in units of analysis regions of size 32×32, the LL region will be encoded in four analysis regions, three of which would normally contain data for neighboring wavelet transform regions. In this alternate embodiment, each analysis array that overlaps a border between wavelet transform regions is replaced by two or four analysis regions (depending on whether the analysis array overlaps one or two region boundaries), with zero values being stored in the appropriate locations so that each analysis array contains data from only one wavelet transform region. The analysis arrays are still stored in "origin sorted order" in the image file 132, with the "origin" now being defined as the coordinate of the coefficient closest to the upper left corner of the analysis array that has not been overwritten with zero values.

In another alternate embodiment, a different transform than the wavelet-like transform could be used, but the resulting image data would still be stored in bit plane order. For instance, a DCT transform could be used.

In some embodiments of the present invention, the raw image array received from the digital camera's image capture mechanism may first be divided into "analysis arrays" and then transformed and quantized. Further, the analysis arrays may each be a thin horizontal strip of the image array. That is, each analysis array may extend the full width of the image array, but have a height of only a few (e.g., 4 to 16) image elements. In yet another embodiment, the image array might not be divided into analysis arrays at all.

Generally, in all embodiments described above, the compressed encoded image data is stored in bit plane order. The reason that bit plane ordered storage is favored is that it makes gradual fidelity reduction very easy: to reduce the fidelity of an image file by a minimum amount, the data for the lowest level bit plane in the file is discarded and the remaining image data is retained, resulting in a smaller file with one bit plane less fidelity.

However, in yet other alternate embodiments, each image file could be organized in "quality level support order" with the data for each analysis array being arranged so that each successive data structure 172 stores the image information needed to increase image quality by one predefined image quality level. Thus, the information in some data structures 172 might represent two, three or more bit planes of information. In this embodiment, an image can be reduced by one quality level by deleting the last data structure 172 from every analysis array data structure 172 in the image file.

Digital Camera State Machines

For the purposes of this explanation, it will be assumed that the digital camera 100 has four predefined image quality levels: High, Very Good+, Very Good−, and Good. It will be further assumed that image files stored at High quality typically occupy about twice as much space as image files stored at Good quality. In other embodiments, more or fewer image quality levels could be used, and the ratio of image file sizes from highest to lowest quality could be larger or smaller than 2:1. For instance, if the camera is capable of taking very high resolution images, such as 2000×2000 pixels or even 4000×4000 pixels, and at very high fidelity, then it would make sense to provide a large number of quality levels with a ratio of image file sizes from highest to lowest quality of perhaps as high as 64:1.

It is noted that an image file's quality cannot be increased once it has been lowered, unless the original image file or an alternate source thereof remains available, because the information needed to restore the image's quality has been lost.

Referring back to FIG. 1, the digital camera 100 preferably includes data processing circuitry 106 for performing a predefined set of primitive operations, such as performing the multiply and addition operations required to apply a transform to a certain amount of image data, as well as a set of state machines 200–212 for controlling the data processing circuitry so as to perform a set of predefined image handling operations. In one embodiment, the state machines in the digital camera are as follows.

One or more state machines 200 for transforming, compressing and storing an image received from the camera's image capture mechanism. This image is sometimes called the "viewfinder" image, since the image being processed is generally the one seen on the camera's image viewer 114. This set of state machines 200 are the ones that initially generate each image file stored in the nonvolatile image memory 108. Prior to taking the picture, the user specifies the quality level of the image to be stored, using the camera's buttons 112. It should noted that in most digital cameras the viewfinder is capable of displaying only a very small and low fidelity version of the captured image, and thus the image displayed in the camera's viewfinder is typically a much lower quality rendition of the captured image than the quality of the "viewfinder" image stored in the image file.

One or more state machines 202 for decompressing, inverse transforming and displaying a stored image file on the camera's image viewer. The reconstructed image generated by decompressing, inverse transforming and dequantizing the image data is stored in camera's framebuffer 118 so that it can be viewed on the image viewer 114.

One or more state machines 204 for updating and displaying a count of the number of images stored in the nonvolatile image memory 108. The image count is preferably displayed on the user interface display 116. This set of state machines 204 will also typically indicate what percentage of the nonvolatile image memory 108 remains unoccupied by image files, or some other indication of the camera's ability to store additional images. If the camera does not have a separate interface display 116, this memory status information may be shown on the image viewer 114, for instance superimposed on the image shown in the image viewer 114 or shown in a region of the viewer 114 separate from the main viewer image.

One or more state machines 206 for implementing a "viewfinder" mode for the camera in which the image currently "seen" by the image capture mechanism 102 is displayed on the image viewer 114 to that the user can see the image that would be stored if the image capture button is pressed. These state machines transfer the image received from the image capture device 102, possibly after appropriate remedial processing steps are performed to improve the raw image data, to the camera's framebuffer 118.

One or more state machines 208 for downloading images from the nonvolatile image memory 108 to an external device, such as a general purpose computer.

One or more state machines 210 for uploading images from an external device, such as a general purpose computer, into the nonvolatile image memory 108. This enables the camera to be used as an image viewing device, and also as a mechanism for transferring image files on memory cards.

One or more state machines 212 for reducing the size of image files in the nonvolatile image memory 108. This will be described in more detail next.

In the context of the present invention, an image file's quality level can be reduced in one of two ways: 1) by deleting from the image file all the analysis arrays associated with one or more transform layers, or 2) by deleting from the image file one or more bit planes of data. In either method, the state machines 212 extract the data structures of the image file that correspond to the new, lower image quality level selected by the user, and then replaces the original image file with one that stores the extracted data structures. Alternately, the original image file is updated by deleting a portion of its contents, thereby freeing some of the memory previously occupied by the file. A feature of the present invention is that the image quality level of an image file can be lowered without having to reconstruct the image and then re-encode it, which would be costly in terms of the computational resources used. Rather, the data structures within the image file are pre-arranged so that the image data in the file does not need to be read, analyzed or reconstructed The image quality level of an image file is lowered simply by keeping an easily determined subset of the data in the image file and deleting the remainder of the data in the image file, or equivalently by extracting and storing in a new image file a determined subset of the data in the image file and deleting the original image file.

For the purposes of this document, it should be noted that the term "deleting" when applied to a data structure in an image file does not necessarily mean that the information in the data structure is replaced with null values. Rather, what this means is that the image file is replaced with another image file that does not contain the "deleted" data structure.

Thus, various data structures in an image file may be deleted simply by copying all the other data structures in the image file into a new image file, and updating all required bookkeeping information in the image file and the image directory for the modified file. The "deleted" data structures may actually remain in memory unchanged until they are overwritten with new information. Alternately, data in an image file may in some implementations be deleted solely by updating the bookkeeping information for the file, without moving any of the image data.

In one embodiment of the present invention, the digital camera lowers the image quality of an image from High quality to "Very Good+" by deleting the two lowest bit planes of the image. Similarly, lowering the image's quality to "Very Good−" is accomplished by deleting two more bit planes of the image, and then lowering the image's quality to Good is accomplished by deleting yet another two bit planes of the image. More generally, each quality level transition is represented by deleting a certain percentage of the bit planes of the highest quality level representation of the image.

In an alternate embodiment, the transition from High quality to the next highest quality level is accomplished by deleting the analysis arrays for a first transform layer (e.g., the analysis arrays for the HL1, HH1 and LH1 regions of the transformed image in FIG. 3). Subsequent quality level transitions to lower quality levels are accomplished by deleting appropriate numbers of bit planes.

In one embodiment of the present invention the digital camera provides two image file size reduction modes. In a first size reduction mode, the user selects one image (or a specified group of images), uses the camera's buttons to indicate what lower quality level the image is to be stored at, and then the state machine 212 generates a smaller image file and stores the resulting image file in the camera's nonvolatile image memory 108. In the second size reduction mode, the user commands the camera to reduce the size of all image files that are currently stored at quality level A to quality level B. For instance, in this second size reduction mode the user might command the camera to convert all "High" quality image files to "Very Good+" image quality files. This latter size reduction mode is particularly useful for "clearing space" in memory 108 to enable additional pictures to be stored in the memory 108.

In another embodiment, the camera or other device may include one or more automatic image file size reduction modes. For instance, in one such mode the camera could be set to record all pictures at a particular quality level. When the camera's memory is sufficiently filed with images files so that there is insufficient room to store one more image at the current quality level setting, the camera automatically reduces the size of enough of the stored image files so as to create room for one more image at the current quality level. In some embodiments, the quality level setting of the device for future images might be automatically reduced to match the quality level of the highest quality image stored in the camera's memory. In this way, the camera takes and stores the maximum quality images for the space available, and this maximization will occur flexibly and "on-the-fly."

Camera Operation and Image File Size Reduction

Figure 5:
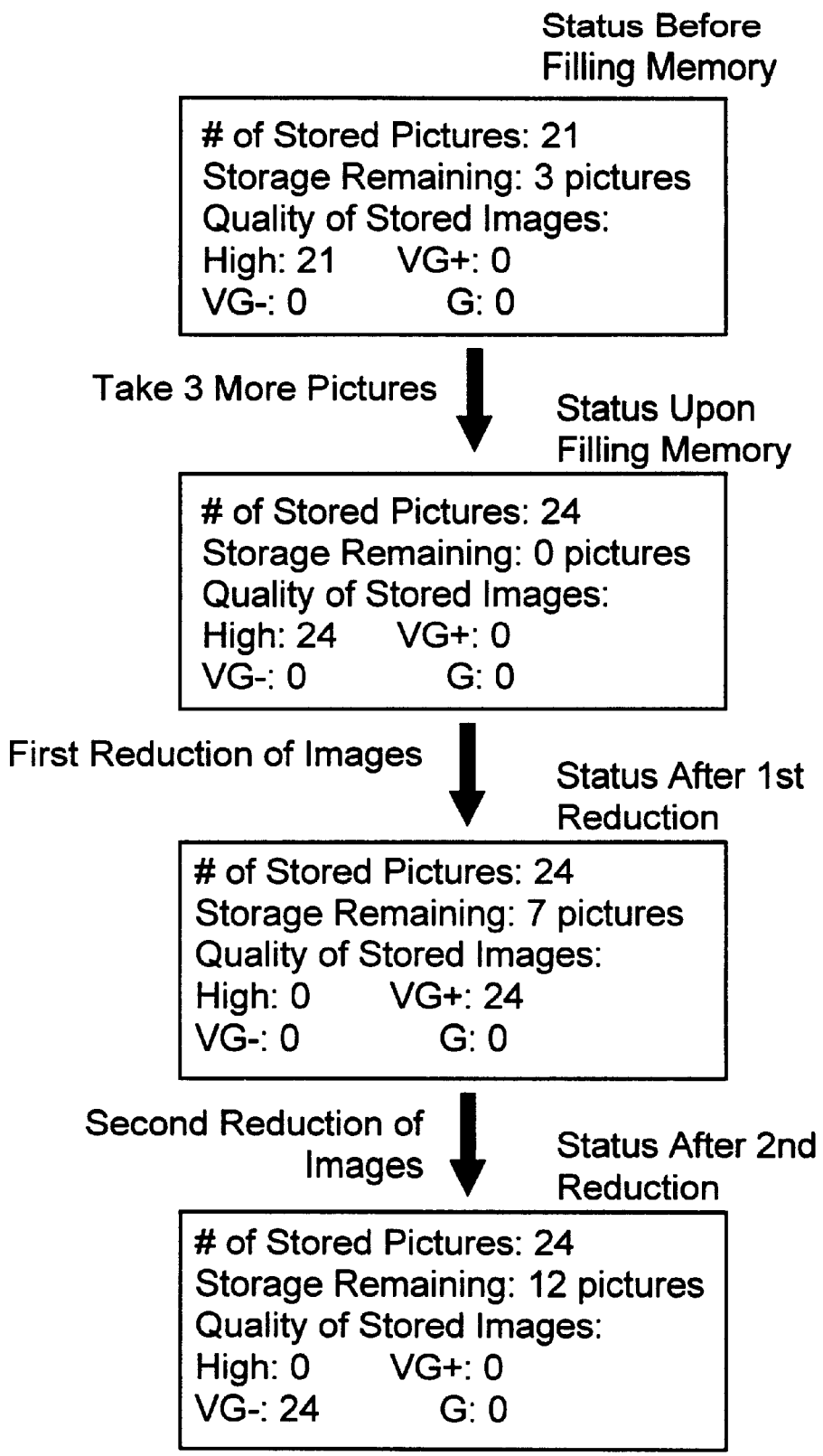
FIG. 5 is a conceptual flow chart depicting changes in the state of a digital camera as various operations are performed.

Referring to FIG. 5, the status of a digital camera is represented by status information displayed on the camera's user interface display 116. For example, before the camera's image memory 108 is filled, the camera might indicate to the user that it is currently storing twenty-one pictures at High quality and has enough memory to store three more pictures. The indication of how many more pictures can be stored in the camera's image memory 108 (FIG. 1) depends on the camera's current picture quality setting, which determines the quality of the next picture to be taken.

After the camera has stored three more pictures, the camera's image memory 108 is full (i.e., it has insufficient room to store another picture at the camera's current picture quality setting), and the camera indicates to the user that it is currently storing twenty-four pictures at High quality and has enough memory to store zero more pictures. For the purposes of this example, we will assume that the user wants to take at least ten more pictures, despite the fact that he/she has no more memory cards. To make this possible, the user utilizes the image size reduction feature of the camera.

In this example, the user commands the camera to reduce all "High" quality image files down one quality level to the "Very Good+" quality level. The camera accomplishes this by running the size reduction state machine 212 and then updating the status information displayed on the camera's user interface display 116. In this example, the twenty-four images are now shown to be stored in image files having the "Very Good+" quality level, and the camera has room for seven new images at the High quality image level.

In this example, the user next commands the camera to perform a second size reduction so as to compress all "Very Good+" quality image files down one quality level to the "Very Good−" quality level. The camera accomplishes this by running the size reduction state machine 212 and then updating the status information displayed on the camera's user interface display 116. In this example, the twenty-four images are now shown to be stored in image files having the "Very Good−" quality level, and the camera has room for twelve new images at the High quality image level.

Alternately, if the user had, before capturing the images, switched the quality level for new images to "Very Good+" quality, a single image size reduction step might have been sufficient to create room for at least ten additional pictures.

In another example, the digital camera may be configured to have an automatic image file size reduction mode that is activated only when the camera's memory is full and the user nevertheless presses the image capture button on the camera. In this mode of operation, the camera's image processing circuitry reduces the size of previously stored image files as little as possible so as to make room for an additional image file. If the user continues to take more pictures in this mode, the quality of the stored images will eventually degrade to some user defined or predefined setting for the lowest allowed quality level, at which point the camera will not store any additional image files until the permitted quality level is lowered further or at least some of the previously stored image files are transferred to another device or otherwise deleted.

The image management system and method of the present invention can also be implemented in computer systems and computer controlled systems, using a data processor that executes procedures for carrying of the image processing steps discussed above. The present invention can also be implemented as a computer program product (e.g., a CD-ROM or data signal conveyed on a carrier signal) containing image processing procedures suitable for use by a computer system.

Video Image Management System

Figure 6:
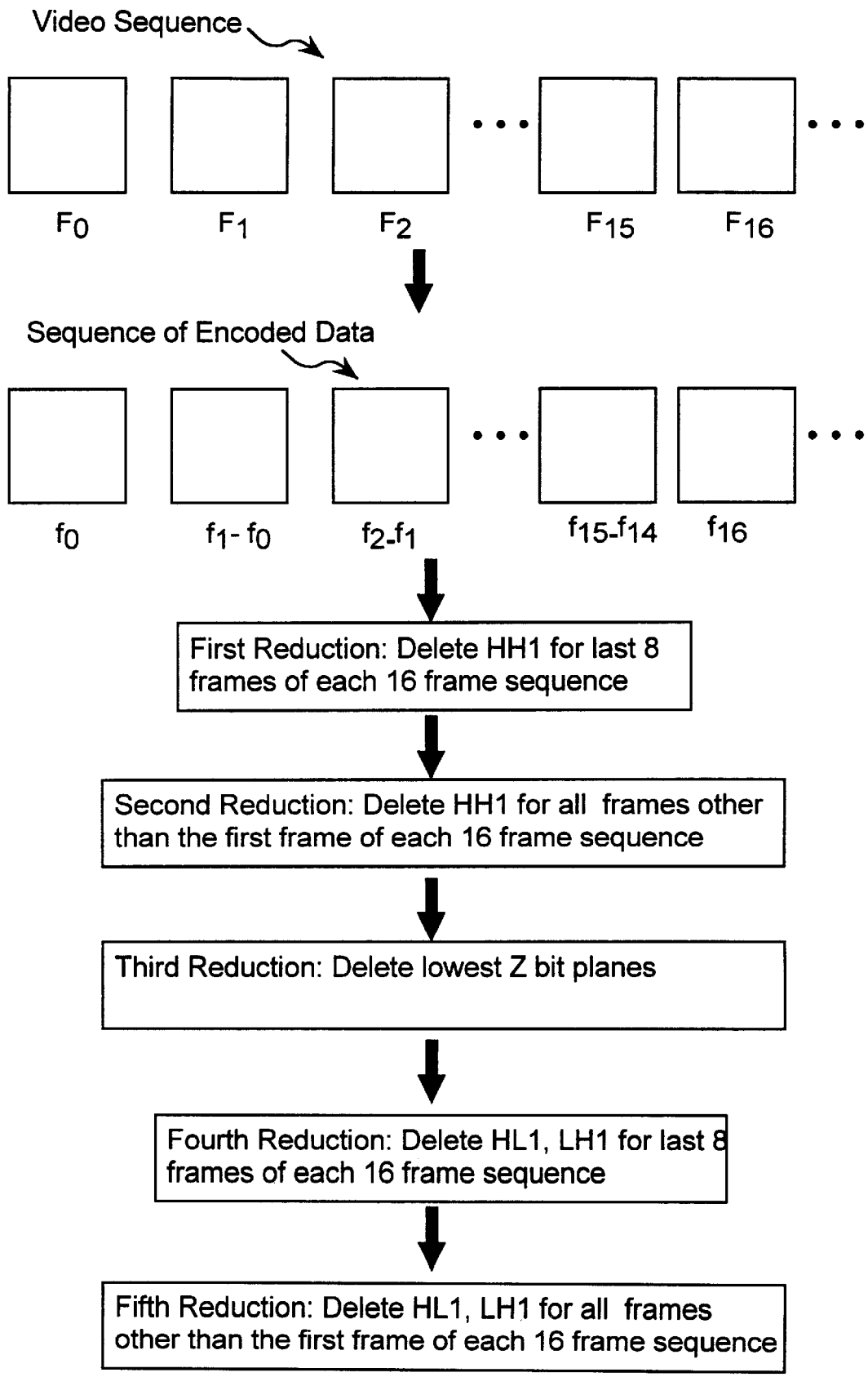
FIG. 6 is a conceptual flow chart depicting changes in the state of a video image sequence as the video image sequence is encoded and compressed.

Referring to FIG. 6, there is shown a conceptual data flow diagram for a video image management system for storing video images at a plurality of image quality levels. The basic structure of the video image management system is the same as shown in FIG. 1. However, when the camera is a digital video camera, successive images $F_i$ are automatically generated at a predefined rate, such as eight, sixteen, twenty-four or thirty frames per second. In a preferred embodiment, the sequence of video images is processed N frames at a time, where N is an integer greater than three, and is preferably equal to four, eight or sixteen; generally N will be determined by the availability of memory and computational resources in the particular system in which the invention is being implemented. That is, each set of N (e.g., sixteen) successive images (i.e., frames) are processed as a set, as follows. For each set of sixteen frames $F_{16x}$ to $F_{16x+15}$, all the frames except the first one are replaced with differential frames. Thus, when N=16, fifteen differential frames $F_{i+1}-F_i$ are generated. Then, following the data processing method shown in FIG. 3 and discussed above, the first frame and the fifteen differential frames are each divided into analysis arrays, a wavelet-like or other transform is applied to the analysis arrays, and then the resulting transform coefficients are encoded.

In alternate embodiments, other methodologies could be used for initially transforming and encoding each set of success frames. For instance, a frame by frame decision might be made, based on a measurement of frame similarity or dissimilarity, as to whether or not to replace the frame with a differential frame before applying the transform and encoding steps.

In all embodiments, the image file (or files) representing the set of frames is stored so as to facilitate the generation of smaller image files with minimal computational resources. In particular, the data in the image file(s) is preferably stored using distinct data structures for each bit plane (see FIG. 4B). Furthermore, as explained above with reference to FIG. 4A, the analysis arrays may be adjusted prior to the transform step so that the boundaries between analysis arrays correspond to the boundaries between transform layer coefficients. By so arranging the data stored in the video image files, the generation of smaller, lower quality level video image files is made much easier.

Continuing to refer to FIG. 6, after the video image files for a video frame sequence have been generated at a particular initial quality level, the user of the device (or the device operating in a particular automatic mode) may decide to reduce the size of the video image files while retaining as much image quality as possible. By way of example, in a first video image file size reduction step, the HH I transform coefficients for the last eight frames of each sixteen frame sequence are deleted. In a second reduction step, the HHI transform coefficients are deleted for all frames other than the first frame of each sixteen frame sequence. In a third reduction step, the Z (e.g., four) least significant bit planes of the video image files are deleted. In a fourth reduction step, the HL1 and LH1 coefficients are deleted for the last eight frames of each sixteen frame sequence. In a fifth reduction step, the HL1 and LH1 coefficients are deleted for all frames other than the first frame of each sixteen frame sequence. These reduction steps are only examples of the type of file size reduction steps that could be performed. For instance, in other embodiments, bit planes might be deleted in earlier reduction steps and transform layers (or portions of transform layers) deleted only in later reduction steps. In general, each video image size reduction causes a corresponding decrease in image quality.

Figure 7:
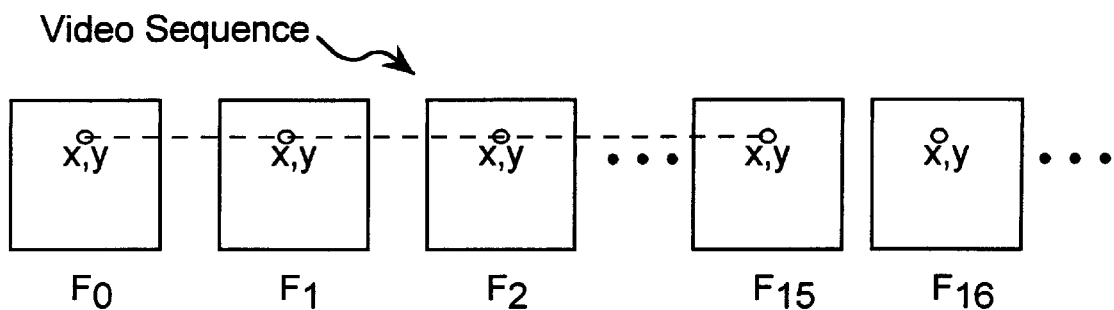
FIGS. 7, 8 and 9 show data structures used in one particular embodiment for video image sequence encoding and compression.
Figure 8:
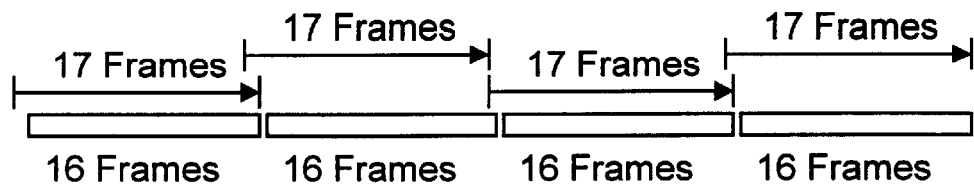
Figure 9:
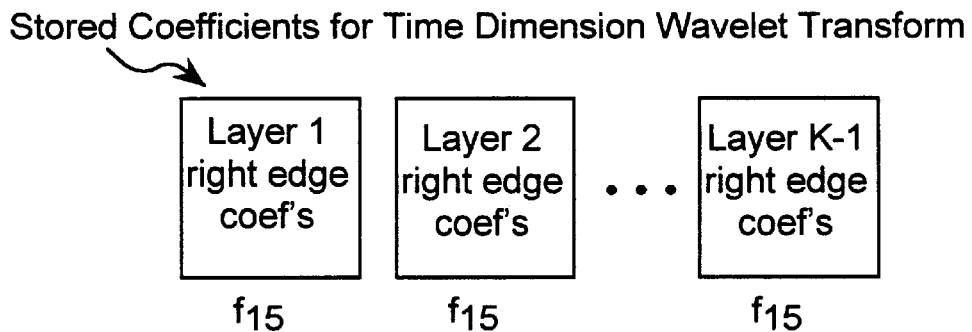

Referring to FIGS. 7, 8 and 9, in another embodiment, video image sequences are compressed and encoded by performing a time domain, one dimensional wavelet transformation on a set of video frames. In particular, the video frames are divided into groups of N frames, where N is an integer greater than 3, and for every x,y pixel position in the video image, a one dimensional K level wavelet transform is performed on the pixels for a sequence of N+1 frames. For instance, the K level wavelet transform is performed on the 1,1 pixels for the last frame of the previous group and the current group of N frames, as well as the 1,2 pixels, the 1,3 pixels and so on.

In order to avoid artifacts from the separate encoding of each group of N frames, the frame immediately preceding the current group is included in K level wavelet transform. The wavelet transform uses a short transform filter that extends only one position to the left (backwards in time) of the position for which a coefficient is being generated and extends in the right hand (forward in time) direction only to the right hand edge of the set of N frames.

Furthermore, as shown in FIG. 8, the "right edge" coefficients are saved for each of the first through K−1 level wavelet transforms for use when processing the next group of N frames. In a preferred embodiment, only the rightmost edge coefficient is saved for each of the first through K−1 level transforms; in other embodiments two or more right edge coefficients may be saved and used when processing the next block of N frames. When the second level transform is performed on a block of N frames, the saved layer 1 right edge coefficients for the previous set of N frames are used (i.e., included in the computation of the leftmost computed coefficient(s) for layer 2). By saving the rightmost edge coefficients for each of the 1 through K−1 layers, artifacts that would caused (during regeneration of the video image sequence) by the discontinuities between the last frame of one block and the first frame of the next block are avoided, resulting in a smoother and more visually pleasing reconstructed video image sequence. The wavelet-like transformation and data compression of a video sequence is shown in pseudocode form in Table 1.

TABLE 1

Pseudocode for Wavelet-Like Transform and
Compression of One Block of Video Frames

```
Repeat for each block of video frames:
{
For each row y (of the images)
   {
   For each column x (of the images)
      {
      Save rightmost edge value for use when processing next block
      of video frames;
      Apply level 1 wavelet-like transform to time-ordered sequence
      of pixel values at position x. y. including saved edge value
      from prior block to generate level 1 L and H coefficients;
      Save rightmost edge L coefficient for use when processing next
      block of video frames;
      Apply level 2 wavelet-like transform to level 1 L coefficients
      for position x, y, including saved level 1 edge value from prior
      block to generate level 2 L and H coefficients;
      Save rightmost edge level 2 L coefficient for use when process-
      ing next block of video frames;
      . . .
      Apply level k-1 wavelet-like transform to level k-2 L
      coefficients for position x, y, including saved level k-2 edge
      value from prior block to generate level k-1 L and H
      coefficients;
      Save rightmost edge level k-1 L coefficient for use when pro-
      cessing next block of video frames;
      Apply level k wavelet-like transform to level k-1 L coefficients
      for position x, y, including saved level k-1 edge value from
      prior block to generate level k L and H coefficients;
```

TABLE 1-continued

Pseudocode for Wavelet-Like Transform and
Compression of One Block of Video Frames

```
      }
   }
Quantize coefficients
Encode coefficients
Store coefficients in image data structure(s), creating image file
for current block of video frames
}
```

A more detailed explanation of saving edge coefficient from one block of image data for use while performing a wavelet or wavelet like transforms on a neighboring block of image data is provided in U.S. patent application Ser. No. 09/358,876, filed Jul. 22, 1999, "Memory Saving Wavelet-Like Image Transform System and Method for Digital Camera And Other Memory Conservative Applications," which is hereby incorporated by reference as background information.

Once the wavelet-like transform of each block of video data has been completed, all other aspects of processing the transformed video data are as described above. That is, the transformed data is quantized, stored in image data structures and subject to reductions in image quality, using the same techniques as those applied to still images and video image sequences as described above.

The video image management system and method of the present invention can also be implemented in computer systems and computer controlled systems, using a data processor that executes procedures for carrying of the video frame processing steps discussed above. The present invention can also be implemented as a computer program product (e.g., a CD-ROM or data signal conveyed on a carrier signal) containing image and/or video frame processing procedures suitable for use by a computer system.

Alternate Embodiments

The state machines of the embodiments described above can be replaced by software procedures that are executed by a general purpose (programmable) data processor or a programmable image data processor, especially if speed of operation is not a concern.

Numerous other aspects of the described embodiments may change over time as technology improvements are used to upgrade various parts of the digital camera. For instance, the memory technology used to store image files might change from flash memory to another type of memory, or a camera might respond to voice commands, enabling the use of fewer buttons.

Figure 10:
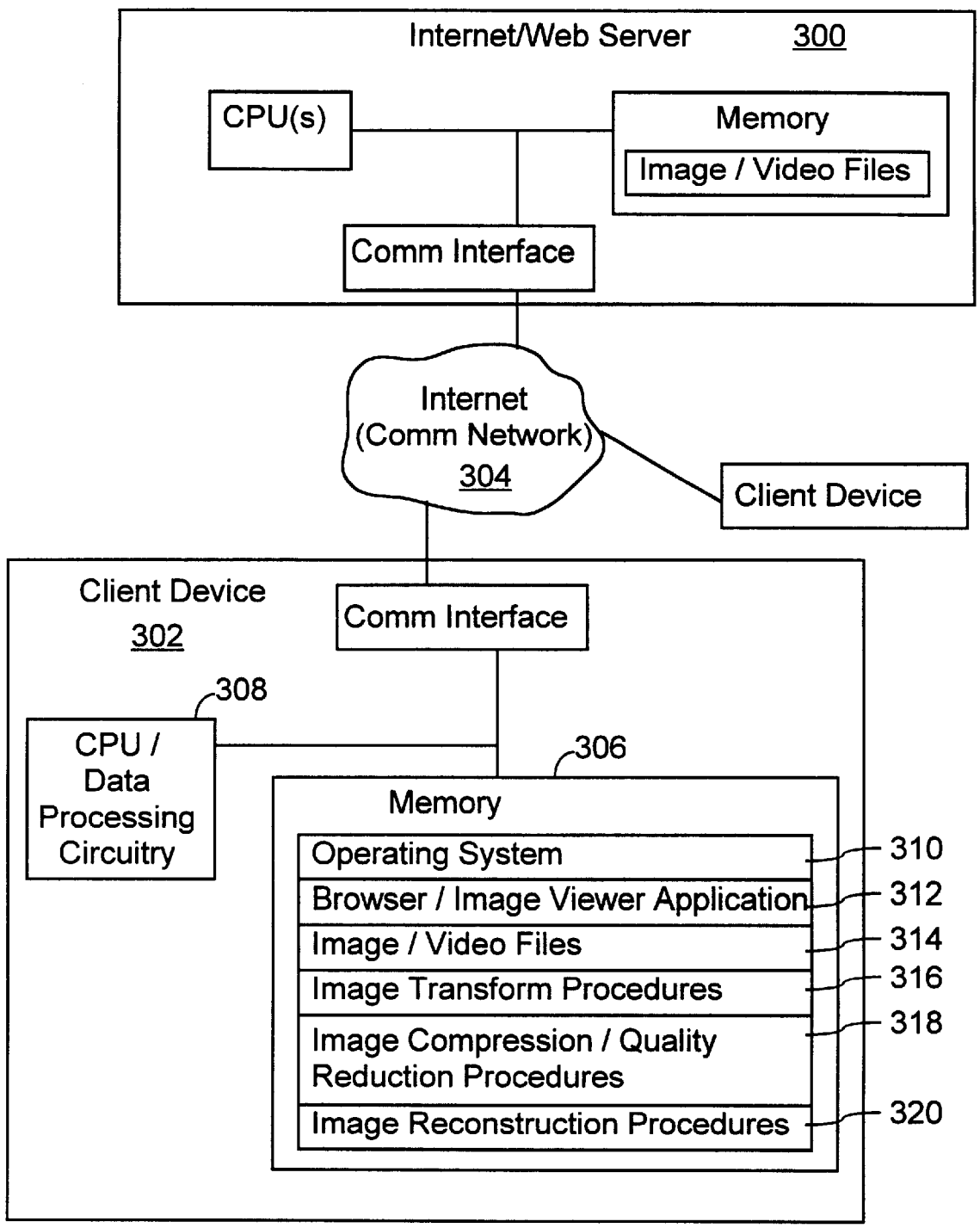
FIG. 10 is a conceptual diagram of an Internet server and client devices that utilize the image or and video image compressing and management features of the present invention.

Referring to FIG. 10, the present invention can also be used in a variety of image processing systems other than digital cameras and digital video cameras, including cable television set top boxes, computer systems and devices used to warehouse libraries of images, computer systems and devices used to store and distribute image files, and so on. For example, an Internet server 300 can store images and/or video sequences in the wavelet transform compressed data structures of the present invention. Copies of those compressed data structures are transferred to the memory 306 of client computers or other client devices 302, using HTTP or any other suitable protocol via the Internet 304 or other communications network. When appropriate, an image or video sequence is reduced in size so as to fit in the memory available in the client computer or other device (client device). Furthermore, once an image or video sequence has been stored in the memory 306 of a client device, the techniques of the present invention can be used to manage the storage of the image, for instance through gradual reduction of image quality so as to make room for the storage of additional images or video sequences. In the embodiment shown in FIG. 10, the memory 306 of the client computer will have stored therein:

- an operating system 310;
- a browser or other image viewer application 312 for viewing documents and images;
- image files 314;
- image transform procedures 316, such as wavelet or wavelet-like transform procedures for converting a raw image array into wavelet transform coefficients, procedures for compressing and encoding the wavelet transform coefficients, as well as other transform procedures for handling images received in other image formats, such JPEG transform procedures for converting JPEG files into reconstructed image data that is then used as the raw image data by a wavelet or wavelet-like transform procedure;
- an image compression, quality reduction procedure 318 for implementing the image data structure size and quality reduction features of the present invention; and
- image reconstruction procedures 320 for decompressing and reverse transforming image files so as to generate reconstructed image data arrays that are suitable for viewing on the monitor of the client workstation, or for printing or other use.

The client workstation memory 306 will typically include both high speed random access memory and slower non-volatile memory such as a hard disk and/or read-only memory. The client workstation's central processing unit(s) 308 execute operating system procedures and image handling procedures, as well as other applications, thereby performing image processing functions similar to those performed by dedicated circuitry in other embodiments of the present invention.

As indicated above, when the present invention is used in conjunction with, or as part of, a browser application, for management of image storage, some images may be initially received in formats other than "raw" image arrays. For instance, some images may be initially received as JPEG files, or in other proprietary or industry standard formats. To make full use of the capabilities of the present invention, such images are preferably decoded so as to generate reconstructed "raw" image arrays, and then those raw image arrays are wavelet or wavelet-like transformed so as to put the images in a form that enables use of the image quality level management features of the present invention.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Image processing apparatus, for use in conjunction with an image capture mechanism, the image processing apparatus comprising:
   - a memory device for storing a plurality of image data structures that each represent a respective image, each image data structure having an associated image quality level corresponding to a quality level at which the corresponding image has been encoded in the image data structure; the image quality level of each image data structure being a member of predefined range of image quality levels that range from a highest quality level to a lowest quality level and that include at least two distinct quality levels;
   - image management logic, including data processing circuitry and state machines for storing and processing image data received from the image capture mechanism, the data processing circuitry and state machines including:
     - image processing circuitry for applying a predefined transform to image data received from the image capture mechanism to generate transform image data and for applying a data compression method to the transform image data so as to generate a new image data structure having an associated image quality level selected from the predefined range of image quality levels; the new image data structure being stored in the memory device;
     - image size reduction circuitry for extracting a subset of the data in a first specified one of the image data structures stored in the memory device, and forming a lower quality version of the first specified image data structure that occupies less space in the memory device than was previously occupied by the first specified image data structure; and
     - image reconstruction circuitry for successively applying a data decompression method and an inverse transform to any specified one of the image data structures so as to generate a reconstructed image suitable for display on an image viewer;
   - wherein the amount of space occupied by images stored in the form of image data structures in the memory device can be reduced so as to make room for the storage of additional image data structures in the memory device.

2. The image processing apparatus of claim 1, wherein each image data structure contains image transform data organized on a bit plane basis such that image transform data for at least one bit plane is stored in distinct portions of the image data structure from image transform data for other bit planes; and
   the image size reduction circuitry and one or more state machines includes logic for extracting a portion of an image data structure that excludes the image transform data for at least one bit plane and for replacing the image data structure with an image data structure containing the extracted portion.

3. The image processing apparatus of claim 1, wherein each of a subset of the image data structures contains image transform data organized on a transform layer basis such that image transform data for at least one transform layer is stored in distinct portions of the image data structure from image transform data for other transform layers; and
   the image size reduction circuitry and one or more state machines includes logic, operative when the first specified data structure is a member of the subset of image data structures, for extracting a portion of the first specified image data structure that excludes the image transform data for at least one transform layer and for replacing the first specified image data structure with an image data structure containing the extracted portion.

4. Image processing apparatus, for use in conjunction with an image capture mechanism, the image processing apparatus comprising:

a memory device for storing a plurality of image data structures that each represent a respective image, each image data structure having an associated image quality level corresponding to a quality level at which the corresponding image has been encoded in the image data structure; the image quality level of each image data structure being a member of predefined range of image quality levels that range from a highest quality level to a lowest quality level and that include at least two distinct quality levels;

image management logic for storing and processing image data received from the image capture mechanism, including:

a data processor coupled to the memory device;

image management procedures, executable by the data processor, including instructions for storing and processing image data received from the image capture mechanism, the instructions including:

an initial image processing procedure for applying a predefined transform to image data received from the image capture mechanism to generate transform image data and for applying a data compression procedure to the transform image data so as to generate an image data structure having an associated image quality level selected from the predefined range of image quality levels;

an image size reduction procedure for lowering the quality level of a first specified one of the image data structures, including instructions for extracting a subset of the data in the first specified image data structure and forming a lower quality version of the first specified image data structure that occupies less space in the memory device than was previously occupied by the first specified image data structure; and at least one image reconstruction procedure for successively applying a data decompression method and an inverse transform to any specified one of the image data structures stored in the memory device so as to generate a reconstructed image suitable for display on an image viewer;

wherein the amount of space occupied by images stored in the form of image data structures in the memory device can be reduced so as to make room for the storage of additional image data structures in the memory device.

5. The image processing apparatus of claim 4, wherein each of the image data structures contains image transform data organized on a bit plane basis such that image transform data for at least one bit plane is stored in distinct portions of the image data structure from image transform data for other bit planes; and the image size reduction instructions include instructions for extracting a portion of an image data structure that excludes the image transform data for at least one bit plane and for replacing the image data structure with an image data structure containing the extracted portion.

6. The image processing apparatus of claim 4, wherein each of a subset of the image data structures contains image transform data organized on a transform layer basis such that image transform data for at least one transform layer is stored in distinct portions of the image data structure from image transform data for other transform layers; and the image size reduction instructions include instructions, operative when the first specified data structure is a member of the subset of image data structures, for extracting a portion of the first specified image data structure that excludes the image transform data for at least one transform layer and for replacing the first specified image data structure with an image data structure containing the extracted portion.

7. Image processing apparatus, comprising:

image management logic, including:

image processing circuitry for applying a predefined transform to an array of image data so as to generate transform image data and for applying a data compression method to the transform image data so as to generate an image data structure having an associated image quality level selected from a predefined range of image quality levels that range from a highest quality level to a lowest quality level and that include at least two distinct quality levels;

a memory device for storing the image data structure and other image data structures representing a set of images;

the image management logic further including:

image size reduction circuitry for extracting a subset of the data in a first specified one of the image data structures stored in the memory device, and forming a reduced size version of the first specified image data structure that occupies less space in the memory device than was previously occupied by the first specified image data structure and that has a lower associated image quality level than the image quality level associated with the first specified image data structure; and image reconstruction circuitry for successively applying a data decompression method and an inverse transform to any specified one of the image data structures stored in the memory device so as to generate a reconstructed image suitable for display on an image viewer;

wherein the amount of space occupied by the image data structures in the memory device can be reduced so as to make room for the storage of additional image data structures in the memory device.

8. The image processing apparatus of claim 7, further including a communications interface for receiving the image data from another apparatus.

9. The image processing apparatus of claim 8, wherein each of a subset of the image data structures contains image transform data organized on a transform layer basis such that image transform data for at least one transform layer is stored in distinct portions of the image data structure from image transform data for other transform layers; and the image size reduction circuitry and one or more state machines includes logic, operative when the first specified data structure is a member of the subset of image data structures, for extracting a portion of the first specified image data structure that excludes the image transform data for at least one transform layer and for replacing the first specified image data structure with an image data structure containing the extracted portion.

10. The image processing apparatus of claim 8, wherein each of a subset of the image data structures contains image transform data organized on a transform layer basis such that image transform data for at least one transform layer is stored in distinct portions of the image data structure from image transform data for other transform layers; and the image size reduction circuitry and one or more state machines includes logic, operative when the first specified data structure is a member of the subset of image data structures, for extracting a portion of the first specified image data structure that excludes the image transform data for at least one transform layer and for replacing the first specified image data structure with an image data structure containing the extracted portion.

11. Image processing apparatus, comprising:

a communications interface for receiving an image data structure having an associated image quality level selected from a predefined range of image quality levels that range from a highest quality level to a lowest quality level and that include at least two distinct quality levels;

a memory device for storing the image data structure and other image data structures representing a set of images;

image management logic, including:
  image size reduction circuitry for extracting a subset of the data in a first specified one of the image data structures to form a reduced size image data structure that occupies less space in the memory device than was previously occupied by the first specified image data structure and that has a lower associated image quality level than the quality level associated with the first specified image data structure; and
  image reconstruction circuitry for successively applying a data decompression method and an inverse transform to any specified one of the image data structures and the reduced size image data structure so as to generate a reconstructed image suitable for display on a display device;

wherein the amount of space occupied by the image data structure in the memory device can be reduced so as to make room for the storage of additional image data structures in the memory device.

12. The image processing apparatus of claim 11, wherein each image data structure contains image transform data organized on a bit plane basis such that image transform data for at least one bit plane is stored in distinct portions of the image data structure from image transform data for other bit planes;

the image size reduction circuitry and one or more state machines including logic for extracting a portion of the first specified image data structure that excludes the image transform data for at least one bit plane and for replacing the first specified image data structure with an image data structure containing the extracted portion.

13. The image processing apparatus of claim 8, wherein each of a subset of the image data structures contains image transform data organized on a transform layer basis such that image transform data for at least one transform layer is stored in distinct portions of the image data structure from image transform data for other transform layers; and the image size reduction circuitry and one or more state machines includes logic, operative when the first specified data structure is a member of the subset of image data structures, for extracting a portion of the first specified image data structure that excludes the image transform data for at least one transform layer and for replacing the first specified image data structure with an image data structure containing the extracted portion.

14. Image processing apparatus, the image processing apparatus comprising:

a communications interface for receiving an image data structure having an associated image quality level selected from a predefined range of image quality levels that range from a highest quality level to a lowest quality level and that include at least two distinct quality levels;

a memory device for storing the image data structure and other image data structures representing a set of images;

a data processor coupled to the memory device;

image management procedures, executable by the data processor, including instructions for storing and processing image data, the instructions including:
  an image size reduction procedure for lowering the quality level of a first specified one of the image data structures, including instructions for extracting a subset of the data in the first specified image data structure and forming a lower quality version of the first specified image data structure that occupies less space in the memory device than was previously occupied by the first specified image data structure; and
  at least one image reconstruction procedure for successively applying a data decompression method and an inverse transform to any specified one of the image data structures stored in the memory device so as to generate a reconstructed image suitable for display on an image viewer;

wherein the amount of space occupied by images stored in the form of image data structures in the memory device can be reduced so as to make room for the storage of additional image data structures in the memory device.

15. The image processing apparatus of claim 14, wherein each of the image data structures contains image transform data organized on a bit plane basis such that image transform data for at least one bit plane is stored in distinct portions of the image data structure from image transform data for other bit planes; and the image size reduction instructions include instructions for extracting a portion of an image data structure that excludes the image transform data for at least one bit plane and for replacing the image data structure with an image data structure containing the extracted portion.

16. The image processing apparatus of claim 14, wherein each of a subset of the image data structures contains image transform data organized on a transform layer basis such that image transform data for at least one transform layer is stored in distinct portions of the image data structure from image transform data for other transform layers; and the image size reduction instructions include instructions, operative when the first specified data structure is a member of the subset of image data structures, for extracting a portion of the first specified image data structure that excludes the image transform data for at least one transform layer and for replacing the first specified image data structure with an image data structure containing the extracted portion.

17. A computer program product, for use in conjunction with a computer system having a memory in which image data structures can be stored, the computer program product comprising a computer readable storage medium and a computer program mechanism embedded therein, the computer program mechanism comprising:

an image handling procedure, including instructions for storing in the memory of the computer system a plurality of image data structures, an image size reduction procedure for accessing image data structures in the memory of the computer system, each of the image data structures containing image transform data, lowering the quality level of a first specified one of the image data structures, including instructions for extracting a subset of the data in a first specified image data structure and forming a lower quality version of the first specified image data structure that occupies less space in the memory device than was previously occupied by the first specified image data structure; and at least one image reconstruction procedure for successively applying a data decompression procedure and an inverse transform to any specified one of the image data structures stored in the memory device so as to generate a reconstructed image suitable for display on an image viewer;

wherein the amount of space occupied by images stored in the form of image data structures in the memory device can be reduced so as to make room for the storage of additional image data structures in the memory device.

18. The computer program product of claim 17, wherein each of the image data structures contains image transform data organized on a bit plane basis such that image transform data for at least one bit plane is stored in distinct portions of the image data structure from image transform data for other bit planes; and the image size reduction procedure includes instructions for extracting a portion of the first specified image data structure that excludes the image transform data for at least one bit plane and for replacing the first specified image data structure with an image data structure containing the extracted portion.

19. The computer program product of claim 17, wherein each of a subset of the image data structures contains image transform data organized on a transform layer basis such that image transform data for at least one transform layer is stored in distinct portions of the image data structure from image transform data for other transform layers; and the image size reduction procedure includes instructions, operative when the first specified data structure is a member of the subset of image data structures, for extracting a portion of the first specified image data structure that excludes the image transform data for at least one transform layer and for replacing the first specified image data structure with an image data structure containing the extracted portion.

20. The computer program product of claim 17, wherein the image handling procedure includes one or more image processing procedures for applying a predefined transform to raw image data to generate transform image data and for applying a data compression procedure to the transform image data so as to generate an image data structure having an associated image quality level selected from the predefined range of image quality levels.

21. A method of processing images, comprising:

storing in a memory device a plurality of image data structures that each represent a respective image, each image data structure having an associated image quality level corresponding to a quality level at which the corresponding image has been encoded in the image data structure; the image quality level of each image data structure being a member of predefined range of image quality levels that range from a highest quality level to a lowest quality level and that include at least two distinct quality levels;

reducing the size of a specified one of the image data structures stored in the nonvolatile memory device, including extracting a subset of the data in the specified image data structure and forming a lower quality version of the specified image data structure that occupies less space in the nonvolatile memory device than was previously occupied by the specified image data structure; and successively applying a data decompression method and an inverse transform to a specified one of the image data structures stored in the nonvolatile memory device so as to generate a reconstructed image suitable for display on an image viewer;

wherein the amount of space occupied by images stored in the form of image data structures in the nonvolatile memory device can be reduced so as to make room for the storage of additional image data structures in the nonvolatile memory device.

22. The method of claim 21, wherein the method is performed by a digital camera and the method includes applying a predefined transform to image data received from an image capture mechanism in the digital camera to generate transform image data, applying a data compression method to the transform image data so as to generate an image data structure having an associated image quality level selected from the predefined range of image quality levels, and storing the image data structure in the memory device.

23. The method of claim 21, wherein the method includes applying a predefined transform to raw image data to generate transform image data, applying a data compression method to the transform image data so as to generate an image data structure having an associated image quality level selected from the predefined range of image quality levels, and storing the image data structure in the memory device.

24. The method of claim 21, wherein each image data structure contains image transform data organized on a bit plane basis such that image transform data for at least one bit plane is stored in distinct portions of the image data structure from image transform data for other bit planes;

the size reduction step includes extracting a portion of an image data structure that excludes the image transform data for at least one bit plane and for replacing the image data structure in the nonvolatile memory device with an image data structure containing the extracted portion.

25. The method of claim 21, wherein each of a subset of the image data structures contains image transform data organized on a transform layer basis such that image transform data for at least one transform layer is stored in distinct portions of the image data structure from image transform data for other transform layers; and the size reduction step includes extracting a portion of the first specified image data structure that excludes the image transform data for at least one transform layer and replacing the first specified image data structure with an image data structure containing the extracted portion.

26. Video image processing apparatus, comprising:

a memory device for storing a set of image data structures representing a sequence of video frames, the set of image data structures having an associated image quality level selected from a predefined range of image quality levels that range from a highest quality level to a lowest quality level and that include at least two distinct quality levels; and image management logic including:

image size reduction circuitry for extracting a subset of the data in the set of image data structures and forming a lower quality version of the set of image data structures that occupies less space in the memory device than was previously occupied by the set of image data structures; and image reconstruction circuitry for successively applying a data decompression method and an inverse transform to at least a subset of the image data structures so as to generate a reconstructed sequence of video frames suitable for display on a display device;

whereby the amount of space occupied by the set of image data structures in the memory device can be reduced so as to make room for the storage of additional image data structures in the memory device.

27. The video image processing apparatus of claim 26, wherein each image data structure contains image transform data organized on a bit plane basis such that image transform data for at least one bit plane is stored in distinct portions of the image data structure from image transform data for other bit planes;

the image size reduction circuitry and one or more state machine s including logic for extracting a portion of an image data structure that excludes the image transform data for at least one bit plane and for replacing the image data structure with an image data structure containing the extracted portion.

28. The video image processing apparatus of claim 26, wherein the image data structures contains image transform data organized on a transform layer basis such that image transform data for at least one transform layer is stored in distinct portions of the image data structure from image transform data for other transform layers; and the image size reduction circuitry and one or more state machines includes logic, operative when the first specified data structure is a member of the subset of image data structures, for extracting a portion of the first specified image data structure that excludes the image transform data for at least one transform layer and for replacing the first specified image data structure with an image data structure containing the extracted portion.

29. The video image processing apparatus of claim 26, wherein the video frames are divided into sub-sequences of N frames, where N is an integer greater than three, and the predefined transform applied to the sequence of video images is a wavelet-like transform that is applied to at least one video frame in each said sub-sequence of N frames.

30. The video image processing apparatus of claim 29, wherein the wavelet-like transform is applied to at least one difference frame for each said sub-sequence of N frames, the difference frame representing differences between one frame and a next frame in said sub-sequence of N frames.

31. The video image processing apparatus of claim 26, wherein the video frames are divided into sub-sequences of N frames, where N is an integer greater than three, and the predefined transform applied to the sequence of video images is a wavelet-like transform that is applied to separately and in time order to data at each x,y position in the video frames.

32. Video image processing apparatus, comprising:

image management logic, including:

image processing circuitry for applying a predefined transform to a sequence of video frames to generate transform image data and for applying a data compression method to the transform image data so as to generate a set of image data structures having an associated image quality level selected from a predefined range of image quality levels that range from a highest quality level to a lowest quality level and that include at least two distinct quality levels;

a memory device for storing the set of image data structures;

the image management logic further including:

image size reduction circuitry for extracting a subset of the data in the set of image data structures and forming a lower quality version of the set of image data structures that occupies less space in the memory device than was previously occupied by the set of image data structures; and image reconstruction circuitry for successively applying a data decompression method and an inverse transform to at least a subset of the image data structures so as to generate a reconstructed sequence of video frames suitable for display on a display device;

whereby the amount of space occupied by the set of image data structures in the memory device can be reduced so as to make room for the storage of additional image data structures in the memory device.

33. The video image processing apparatus of claim 32, wherein each image data structure contains image transform data organized on a bit plane basis such that image transform data for at least one bit plane is stored in distinct portions of the image data structure from image transform data for other bit planes;

the image size reduction circuitry and one or more state machines including logic for extracting a portion of an image data structure that excludes the image transform data for at least one bit plane and for replacing the image data structure with an image data structure containing the extracted portion.

34. The video image processing apparatus of claim 32, wherein the image data structures contains image transform data organized on a transform layer basis such that image transform data for at least one transform layer is stored in distinct portions of the image data structure from image transform data for other transform layers; and the image size reduction circuitry and one or more state machines includes logic, operative when the first specified data structure is a member of the subset of image data structures, for extracting a portion of the first specified image data structure that excludes the image transform data for at least one transform layer and for replacing the first specified image data structure with an image data structure containing the extracted portion.

35. The video image processing apparatus of claim 32, wherein the video frames are divided into sub-sequences of N frames, where N is an integer greater than three, and the predefined transform applied to the sequence of video images is a wavelet-like transform that is applied to at least one video frame in each said sub-sequence of N frames.

36. The video image processing apparatus of claim 35, wherein the wavelet-like transform is applied to at least one difference frame for each said sub-sequence of N frames, the difference frame representing differences between one frame and a next frame in said sub-sequence of N frames.

37. The video image processing apparatus of claim 32, wherein the video frames are divided into sub-sequences of N frames, where N is an integer greater than three, and the predefined transform applied to the sequence of video images is a wavelet-like transform that is applied to separately and in time order to data at each x,y position in the video frames.

38. Video image processing apparatus, comprising:
  a memory device for storing a set of image data structures representing a sequence of video frames, the set of image data structures having an associated image quality level selected from a predefined range of image quality levels that range from a highest quality level to a lowest quality level and that include at least two distinct quality levels;
  a data processor coupled to the memory device;
  image management procedures, executable by the data processor, including
    an image size reduction procedure for extracting a subset of the data in the set of image data structures and forming a lower quality version of the set of image data structures that occupies less space in the memory device than was previously occupied by the set of image data structures; and
    at least one image reconstruction procedure for successively applying a data decompression method and an inverse transform to at least a subset of the image data structures so as to generate a reconstructed sequence of video frames suitable for display on a display device;
  whereby the amount of space occupied by the set of image data structures in the memory device can be reduced so as to make room for the storage of additional image data structures in the memory device.

39. The video image processing apparatus of claim 38, wherein
  each image data structure contains image transform data organized on a bit plane basis such that image transform data for at least one bit plane is stored in distinct portions of the image data structure from image transform data for other bit planes;
  the at least one image size reduction procedure includes instructions for extracting a portion of an image data structure that excludes the image transform data for at least one bit plane and for replacing the image data structure with an image data structure containing the extracted portion.

40. The video image processing apparatus of claim 38, wherein
  the image data structures contains image transform data organized on a transform layer basis such that image transform data for at least one transform layer is stored in distinct portions of the image data structure from image transform data for other transform layers; and
  the at least one image size reduction procedure and one or more state machines include logic, operative when the first specified data structure is a member of the subset of image data structures, for extracting a portion of the first specified image data structure that excludes the image transform data for at least one transform layer and for replacing the first specified image data structure with an image data structure containing the extracted portion.

41. The video image processing apparatus of claim 38, wherein the video frames are divided into sub-sequences of N frames, where N is an integer greater than three, and the predefined transform applied to the sequence of video images is a wavelet-like transform that is applied to at least one video frame in each said sub-sequence of N frames.

42. The video image processing apparatus of claim 41, wherein the wavelet-like transform is applied to at least one difference frame for each said sub-sequence of N frames, the difference frame representing differences between one frame and a next frame in said sub-sequence of N frames.

43. The video image processing apparatus of claim 38, wherein the video frames are divided into sub-sequences of N frames, where N is an integer greater than three, and the predefined transform applied to the sequence of video images is a wavelet-like transform that is applied to separately and in time order to data at each x,y position in the video frames.

44. Video image processing apparatus, comprising:
  a memory device for storing image data structures;
  a data processor coupled to the memory device;
  image management procedures, executable by the data processor, including:
    at least one image processing procedure for applying a predefined transform to a sequence of video frames to generate transform image data and for applying a data compression method to the transform image data so as to generate a set of image data structures having an associated image quality level selected from a predefined range of image quality levels that range from a highest quality level to a lowest quality level and that include at least two distinct quality levels, and for storing the set of image data structures in the memory device;
    an image size reduction procedure for extracting a subset of the data in the set of image data structures and forming a lower quality version of the set of image data structures that occupies less space in the memory device than was previously occupied by the set of image data structures; and
    at least one image reconstruction procedure for successively applying a data decompression method and an inverse transform to at least a subset of the image data structures so as to generate a reconstructed sequence of video frames suitable for display on a display device;
  whereby the amount of space occupied by the set of image data structures in the memory device can be reduced so as to make room for the storage of additional image data structures in the memory device.

45. The video image processing apparatus of claim 44, wherein
  each image data structure contains image transform data organized on a bit plane basis such that image transform data for at least one bit plane is stored in distinct portions of the image data structure from image transform data for other bit planes;
  the at least one image size reduction procedure includes instructions for extracting a portion of an image data structure that excludes the image transform data for at least one bit plane and for replacing the image data structure with an image data structure containing the extracted portion.

46. The video image processing apparatus of claim 44, wherein
  the image data structures contains image transform data organized on a transform layer basis such that image transform data for at least one transform layer is stored in distinct portions of the image data structure from image transform data for other transform layers; and the at least one image size reduction procedure and one or more state machines include logic, operative when the first specified data structure is a member of the subset of image data structures, for extracting a portion of the first specified image data structure that excludes the image transform data for at least one transform layer and for replacing the first specified image data structure with an image data structure containing the extracted portion.

47. The video image processing apparatus of claim 44, wherein the video frames are divided into sub-sequences of N frames, where N is an integer greater than three, and the predefined transform applied to the sequence of video images is a wavelet-like transform that is applied to at least one video frame in each said sub-sequence of N frames.

48. The video image processing apparatus of claim 47, wherein the wavelet-like transform is applied to at least one difference frame for each said sub-sequence of N frames, the difference frame representing differences between one frame and a next frame in said sub-sequence of N frames.

49. The video image processing apparatus of claim 44, wherein the video frames are divided into sub-sequences of N frames, where N is an integer greater than three, and the predefined transform applied to the sequence of video images is a wavelet-like transform that is applied to separately and in time order to data at each x,y position in the video frames.

50. A computer program product, for use in conjunction with a computer system having a memory in which image data structures can be stored, the computer program product comprising a computer readable storage medium and a computer program mechanism embedded therein, the computer program mechanism comprising:

an image handling procedure, including instructions for storing in the memory of the computer system a set of image data structures representing a sequence of video frames, the set of image data structures having an associated image quality level selected from a predefined range of image quality levels that range from a highest quality level to a lowest quality level and that include at least two distinct quality levels;

a data processor coupled to the memory device;

an image size reduction procedure for extracting a subset of the data in the set of image data structures and forming a lower quality version of the set of image data structures that occupies less space in the memory device than was previously occupied by the set of image data structures; and at least one image reconstruction procedure for successively applying a data decompression method and an inverse transform to at least a subset of the image data structures so as to generate a reconstructed sequence of video frames suitable for display on a display device;

whereby the amount of space occupied by the set of image data structures in the memory device can be reduced so as to make room for the storage of additional image data structures in the memory device.

51. The computer program product of claim 50, wherein each image data structure contains image transform data organized on a bit plane basis such that image transform data for at least one bit plane is stored in distinct portions of the image data structure from image transform data for other bit planes;

the at least one image size reduction procedure includes instructions for extracting a portion of an image data structure that excludes the image transform data for at least one bit plane and for replacing the image data structure with an image data structure containing the extracted portion.

52. The computer program product of claim 50, wherein the image data structures contains image transform data organized on a transform layer basis such that image transform data for at least one transform layer is stored in distinct portions of the image data structure from image transform data for other transform layers; and the at least one image size reduction procedure and one or more state machines include logic, operative when the first specified data structure is a member of the subset of image data structures, for extracting a portion of the first specified image data structure that excludes the image transform data for at least one transform layer and for replacing the first specified image data structure with an image data structure containing the extracted portion.

53. The computer program product of claim 50, wherein the video frames are divided into sub-sequences of N frames, where N is an integer greater than three, and the predefined transform applied to the sequence of video images is a wavelet-like transform that is applied to at least one video frame in each said sub-sequence of N frames.

54. The computer program product of claim 53, wherein the wavelet-like transform is applied to at least one difference frame for each said sub-sequence of N frames, the difference frame representing differences between one frame and a next frame in said sub-sequence of N frames.

55. The computer program product of claim 50, wherein the video frames are divided into sub-sequences of N frames, where N is an integer greater than three, and the predefined transform applied to the sequence of video images is a wavelet-like transform that is applied to separately and in time order to data at each x,y position in the video frames.

56. The computer program product of claim 50, including:

at least one image processing procedure for applying a predefined transform to a sequence of video frames to generate transform image data and for applying a data compression method to the transform image data so as to generate the set of image data structures stored in the memory.

57. The computer program product of claim 56, wherein each image data structure contains image transform data organized on a bit plane basis such that image transform data for at least one bit plane is stored in distinct portions of the image data structure from image transform data for other bit planes;

the at least one image size reduction procedure includes instructions for extracting a portion of an image data structure that excludes the image transform data for at least one bit plane and for replacing the image data structure with an image data structure containing the extracted portion.

58. The computer program product of claim 56, wherein the image data structures contains image transform data organized on a transform layer basis such that image transform data for at least one transform layer is stored in distinct portions of the image data structure from image transform data for other transform layers; and the at least one image size reduction procedure and one or more state machines include logic, operative when the first specified data structure is a member of the subset of image data structures, for extracting a portion of the first specified image data structure that excludes the image transform data for at least one transform layer and for replacing the first specified image data structure with an image data structure containing the extracted portion.

59. The computer program product of claim 56, wherein the video frames are divided into sub-sequences of N frames, where N is an integer greater than three, and the predefined transform applied to the sequence of video images is a wavelet-like transform that is applied to at least one video frame in each said sub-sequence of N frames.

60. The computer program product of claim 59, wherein the wavelet-like transform is applied to at least one difference frame for each said subsequence of N frames, the difference frame representing differences between one frame and a next frame in said sub-sequence of N frames.

61. The computer program product of claim 56, wherein the video frames are divided into sub-sequences of N frames, where N is an integer greater than three, and the predefined transform applied to the sequence of video images is a wavelet-like transform that is applied to separately and in time order to data at each x,y position in the video frames.

62. A method of processing video images, comprising:
storing in a memory device a set of image data structures representing a sequence of video frames, the set of image data structures having an associated image quality level selected from a predefined range of image quality levels that range from a highest quality level to a lowest quality level and that include at least two distinct quality levels;
extracting a subset of the data in the set of image data structures and forming a lower quality version of the set of image data structures that occupies less space in the memory device than was previously occupied by the set of image data structures; and
successively applying a data decompression method and an inverse transform to the specified set of image data structures so as to generate a reconstructed sequence of video images suitable for display on a display device;
whereby the amount of space occupied by the set of image data structures in the memory device can be reduced so as to make room for the storage of additional image data structures in the memory device.

63. The method of claim 62, wherein
each of the image data structures contains image transform data organized on a bit plane basis such that image transform data for at least one bit plane is stored in distinct portions of the image data structure from image transform data for other bit planes;
the extracting step includes extracting a portion of an image data structure that excludes the image transform data for at least one bit plane, and the forming step includes replacing the image data structure with an image data structure containing the extracted portion.

64. The method of claim 62, wherein
the of the image data structures contains image transform data organized on a transform layer basis such that image transform data for at least one transform layer is stored in distinct portions of the image data structure from image transform data for other transform layers; and
the extracting step includes extracting a portion of the first specified image data structure that excludes the image transform data for at least one transform layer, and the forming step includes replacing the first specified image data structure with an image data structure containing the extracted portion.

65. The method of claim 62, after performing the extracting and forming steps, applying the predefined transform to a sequence of additional video images to generate transform image data and applying the data compression method to the transform image data so as to generate an additional set of image data structures having an associated image quality, and storing the additional set of image data structures in the memory device.

66. The method of claim 62, wherein the video frames are divided into sub-sequences of N frames, where N is an integer greater than three, and the predefined transform applied to the sequence of video images is a wavelet-like transform that is applied to at least one video frame in each said sub-sequence of N frames.

67. The method of claim 66, wherein the wavelet-like transform is applied to at least one difference frame for each said sub-sequence of N frames, the difference frame representing differences between one frame and a next frame in said sub-sequence of N frames.

68. The method of claim 62, wherein the video frames are divided into sub-sequences of N frames, where N is an integer greater than three, and the predefined transform applied to the sequence of video images is a wavelet-like transform that is applied to separately and in time order to data at each x,y position in the video frames.

69. The method of claim 62, including applying a predefined transform to a sequence of video images to generate transform image data and applying a data compression method to the transform image data so as to generate the set of image data structures stored in the memory device.

70. The method of claim 69, wherein
each of the image data structures contains image transform data organized on a bit plane basis such that image transform data for at least one bit plane is stored in distinct portions of the image data structure from image transform data for other bit planes;
the extracting step includes extracting a portion of an image data structure that excludes the image transform data for at least one bit plane, and the forming step includes replacing the image data structure with an image data structure containing the extracted portion.

71. The method of claim 69, wherein
the of the image data structures contains image transform data organized on a transform layer basis such that image transform data for at least one transform layer is stored in distinct portions of the image data structure from image transform data for other transform layers; and
the extracting step includes extracting a portion of the first specified image data structure that excludes the image transform data for at least one transform layer, and the forming step includes replacing the first specified image data structure with an image data structure containing the extracted portion.

72. The method of claim 69, after performing the extracting and forming steps, applying the predefined transform to a sequence of additional video images to generate transform image data and applying the data compression method to the transform image data so as to generate an additional set of image data structures having an associated image quality, and storing the additional set of image data structures in the memory device.

73. The method of claim 69, wherein the video frames are divided into sub-sequences of N frames, where N is an integer greater than three, and the predefined transform applied to the sequence of video images is a wavelet-like transform that is applied to at least one video frame in each said sub-sequence of N frames.

74. The method of claim 73, wherein the wavelet-like transform is applied to at least one difference frame for each said sub-sequence of N frames, the difference frame representing differences between one frame and a next frame in said sub-sequence of N frames.

75. The method of claim 69, wherein the video frames are divided into sub-sequences of N frames, where N is an integer greater than three, and the predefined transform applied to the sequence of video images is a wavelet-like transform that is applied to separately and in time order to data at each x,y position in the video frames.

* * * * *